US010174758B2

(12) United States Patent
Nowitzky et al.

(10) Patent No.: US 10,174,758 B2
(45) Date of Patent: Jan. 8, 2019

(54) PUMP UNIT

(71) Applicant: Robert Bosch GmbH, Stuttgart (DE)

(72) Inventors: Ingo Nowitzky, Ludwigsburg (DE);
Dieter Amesoeder, Ludwigsburg (DE);
Oliver Laforsch, Stuttgart (DE); Sando Kunath, Stuttgart (DE); Evgenij Skrynski, Stuttgart (DE); Marian Kacmar, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 14/893,498

(22) PCT Filed: May 15, 2014

(86) PCT No.: PCT/EP2014/059907
§ 371 (c)(1),
(2) Date: Nov. 23, 2015

(87) PCT Pub. No.: WO2014/187716
PCT Pub. Date: Nov. 27, 2014

(65) Prior Publication Data
US 2016/0097388 A1    Apr. 7, 2016

(30) Foreign Application Priority Data

May 23, 2013  (DE) .................. 10 2013 209 620
May 14, 2014  (DE) .................. 10 2014 209 140

(51) Int. Cl.
*F04C 3/08*    (2006.01)
*F04C 15/00*    (2006.01)
(Continued)

(52) U.S. Cl.
CPC .............. *F04C 3/08* (2013.01); *F04C 11/008* (2013.01); *F04C 15/008* (2013.01); *H02K 1/278* (2013.01);
(Continued)

(58) Field of Classification Search
CPC .. F04C 15/008; F04C 15/0096; F04C 11/008; F04C 3/03; F04C 2240/60; F04C 2240/08; F04C 3/00
See application file for complete search history.

(56) References Cited

U.S. PATENT DOCUMENTS 2,831,436 A * 4/1958 Schmidt .................. F04C 2/025
418/194
3,653,790 A * 4/1972 Ifield .......................... F04C 3/06
418/194
(Continued)

FOREIGN PATENT DOCUMENTS

DE   102007033659 A1   1/2009
DE   102008016293      10/2009
(Continued)

OTHER PUBLICATIONS

International Search Report for Application No. PCT/EP2014/059907 dated Jan. 7, 2015 (English Translation, 3 pages).

Primary Examiner — Charles Freay
(74) Attorney, Agent, or Firm — Michael Best & Friedrich LLP

(57) ABSTRACT

Pump units are known that have a drive shaft and a rotor, which is driven by the drive shaft and is arranged rotatably in a housing, the drive shaft having an oblique sliding plane, which interacts with the rotor and allows the rotor to nutate with the rotor axis thereof about a drive axis of the drive shaft, the rotor having a set of teeth on the end face of the rotor facing away from the drive shaft, said teeth meshing with a set of teeth formed on a housing of the pump unit, working spaces being formed between the teeth of the rotor and the teeth of the housing, which working spaces can be filled via an inlet and emptied via an outlet. It is disadvantageous that the pump unit has a comparatively large axial installation length, because the drive of the pump unit is (Continued)

arranged on an end of the drive shaft facing away from the rotor. In the pump unit according to the invention, the axial installation length is shortened. According to the invention the drive shaft (1) is surrounded by a stator (15) and magnets (16) are provided on the drive shaft (1), which magnets interact magnetically with the stator (15).

9 Claims, 2 Drawing Sheets

(51) Int. Cl.
  *F04C 11/00* (2006.01)
  *H02K 1/27* (2006.01)
  *H02K 5/128* (2006.01)
  *H02K 7/08* (2006.01)

(52) U.S. Cl.
  CPC ............ *H02K 5/128* (2013.01); *H02K 7/088* (2013.01); *F04C 2240/60* (2013.01)

(56) References Cited

U.S. PATENT DOCUMENTS

| | | | | |
|---|---|---|---|---|
| 3,667,870 | A | | 6/1972 | Yoshida et al. |
| 4,878,804 | A | * | 11/1989 | Akerman ............ F04D 13/0633 415/111 |
| 4,994,078 | A | * | 2/1991 | Jarvik ................. A61M 1/1003 415/900 |
| 5,508,575 | A | * | 4/1996 | Elrod, Jr. ................ F16C 25/08 310/156.04 |
| 8,360,748 | B2 | * | 1/2013 | Arnold .................... F04C 2/086 417/360 |
| 8,517,707 | B2 | * | 8/2013 | Arnold .................... F01C 3/085 418/195 |
| 8,777,595 | B2 | * | 7/2014 | Arnold ...................... F01C 3/08 417/410.4 |
| 2008/0309185 | A1 | * | 12/2008 | Popov ................ H01F 41/0273 310/90.5 |
| 2010/0104462 | A1 | * | 4/2010 | Arnold .................... F01C 1/084 418/142 |
| 2011/0238172 | A1 | * | 9/2011 | Akdis .................. A61M 1/101 623/3.11 |

FOREIGN PATENT DOCUMENTS

| | | |
|---|---|---|
| DE | 102010040758 | 3/2012 |
| JP | 4484030 B2 | 6/2010 |
| WO | 2005024237 | 3/2005 |
| WO | 2007128303 | 11/2007 |
| WO | 2008110155 | 9/2008 |

* cited by examiner

PUMP UNIT

BACKGROUND OF THE INVENTION

The invention relates to a pump unit.

A pump unit is already known from the German patent publication DE 10 2010 040 758 A1, comprising a drive shaft and a rotor, which is driven by the drive shaft and is arranged rotatably in a housing, the drive shaft having an oblique sliding plane, which interacts with the rotor and allows the rotor to nutate with the rotor axis thereof about a drive axis of the drive shaft, the rotor having a set of teeth on the end face of the rotor facing away from the drive shaft, said teeth meshing with a set of teeth formed on a housing of the pump unit, working spaces being formed between the teeth of the rotor and the teeth of the housing, which working spaces can be filled via an inlet and emptied via an outlet. It is disadvantageous that the pump unit has a comparatively large axial installation length, because the drive of the pump is arranged on an end of the drive shaft facing away from the rotor.

SUMMARY OF THE INVENTION

The pump unit according to the invention has in contrast the advantage that the axial installation length of the pump unit is significantly shortened by virtue of the drive shaft being surrounded by a stator and magnets being provided on the drive shaft, which magnets interact magnetically with the stator. By means of the embodiment according to the invention, the drive shaft is designed as an armature of an electric machine. In this way, the function of the armature is integrated into the drive shaft. The number of required components is therefore reduced.

It is particularly advantageous if the drive shaft has at least one pocket or recess for accommodating the magnets, because the magnets are integrated in this manner flush with the drive shaft, i.e. do not protrude beyond said drive shaft.

It is advantageous if the magnets on the drive shaft are located off-center with respect to the stator and as viewed in the direction of the drive axis, such that the drive shaft is pressed with a predetermined magnetic force against the rotor. This results from the fact that the drive shaft and the rotor are continually pressed with a constant magnetic force against the teeth of the housing. As a result, the pump unit can be better started when switching on the electric motor. Stated in other words, the drive shaft and the rotor can be more easily set into rotation.

It is furthermore advantageous if the magnets are permanent magnets because a permanently excited electric machine is formed.

According to an advantageous embodiment of the invention, the drive shaft is encased by a cylinder in the region of the magnets because the magnets are encapsulated and protected from the fluid of the pump unit in this way.

It is very advantageous if a shaft bearing is provided for mounting the drive shaft at each end face of the stator because the drive shaft is precisely mounted in this manner.

It is also advantageous, if the shaft bearing is designed as a slide bearing, because slide bearings can be implemented in a particularly robust and cost-effective manner.

In addition, it is advantageous if the shaft bearings are provided on a disk-shaped or annular component. It is additionally advantageous if the shaft bearings are injection molded with a plastic material to the stator because the shaft bearings can be implemented in this way particularly cost effectively and the function of the shaft bearing is integrated into the plastic of the molding.

BRIEF DESCRIPTION OF THE DRAWINGS

An exemplary embodiment of the invention is depicted in the drawing in a simplified manner and described in greater detail in the following description.

DETAILED DESCRIPTION

Figure 1:
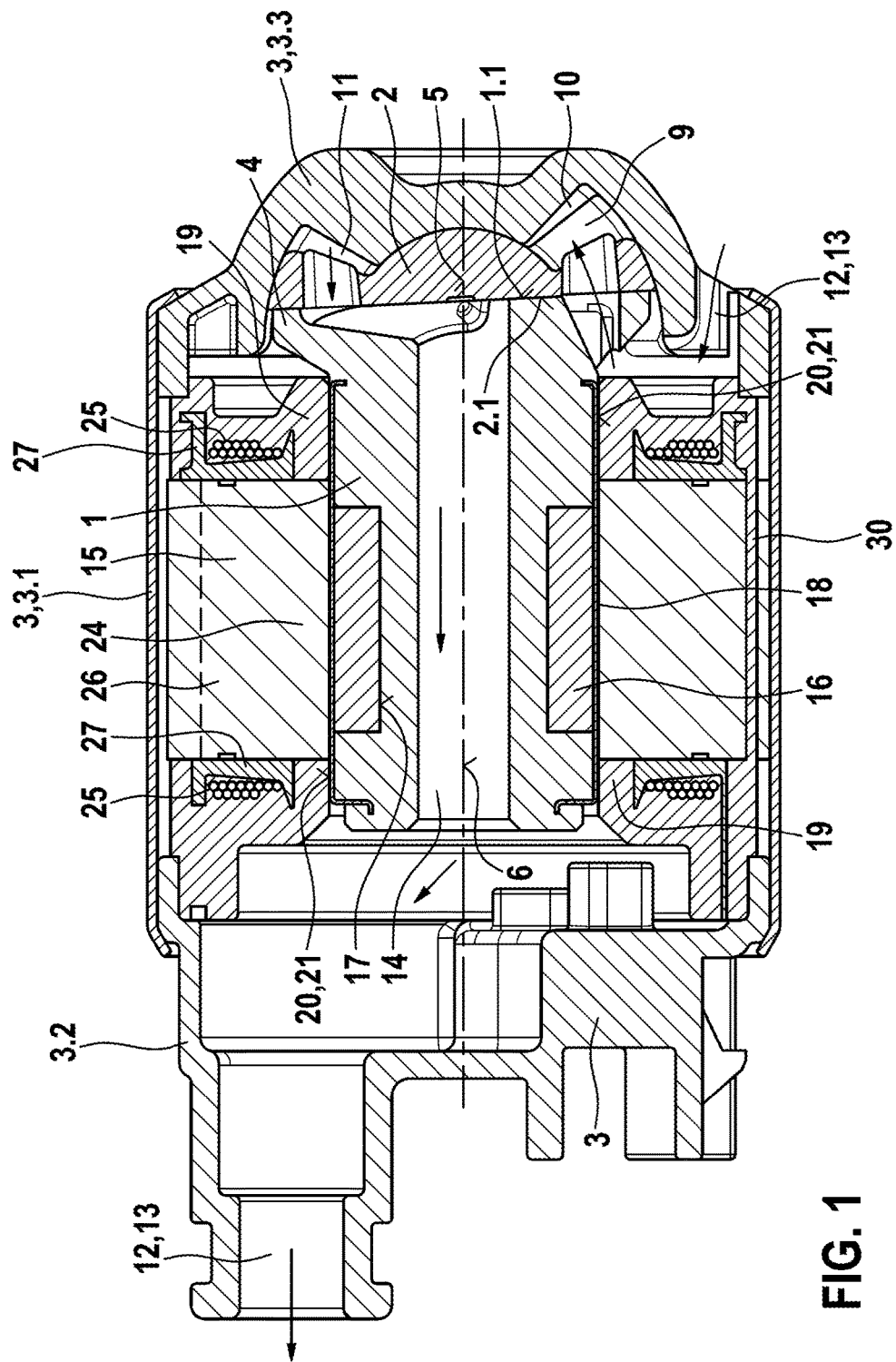
FIG. 1 shows a cross-sectional view of a pump unit according to the invention.

The pump unit, for example a pump or a compressor, comprises a drive shaft 1, which drives a rotor 2 that is arranged rotatably in a housing 3. The drive shaft 1 has an oblique sliding plane 1.1 on the end thereof facing the rotor 2, said sliding plane interacting with the rotor 2. The sliding plane 1.1 is, for example, formed on a shoulder 4 of the drive shaft 1 and allows the rotor 2 to nutate with the rotor axis 5 thereof about a drive axis 6 of the drive shaft 1. The rotor 2 has a sliding surface 2.1 which interacts with the oblique sliding plane 1.1 on the side thereof facing the drive shaft 1 and a set of teeth 9 on the end face thereof facing away from the drive shaft 1, said teeth meshing with the set of teeth 10 formed on the housing 3. Working spaces 11 are formed between the teeth 9 of the rotor 2 and the teeth 10 of the housing 3, which working spaces can be filled via an inlet 12 of the pump unit and emptied via an outlet 13 of the pump unit. The teeth 9 of the rotor 2 and the teeth 10 of the housing 3 are, for example, designed as cycloidal teeth, can however be a different type of teeth.

The pump unit operates according to the displacement principle so that the fluid is sucked in a self-priming manner across the inlet 12 into the working spaces 11 and discharged at increased pressure out of said working spaces via the outlet 13. The drive shaft 1 has a through passage 14 in order to transport fluid from the inlet 12 into the working spaces 11 or out of said working spaces to the outlet 13. Which opening 12, 13 of the pump unit inlet or outlet is used depends on the rotational direction of the rotor.

Figure 2:
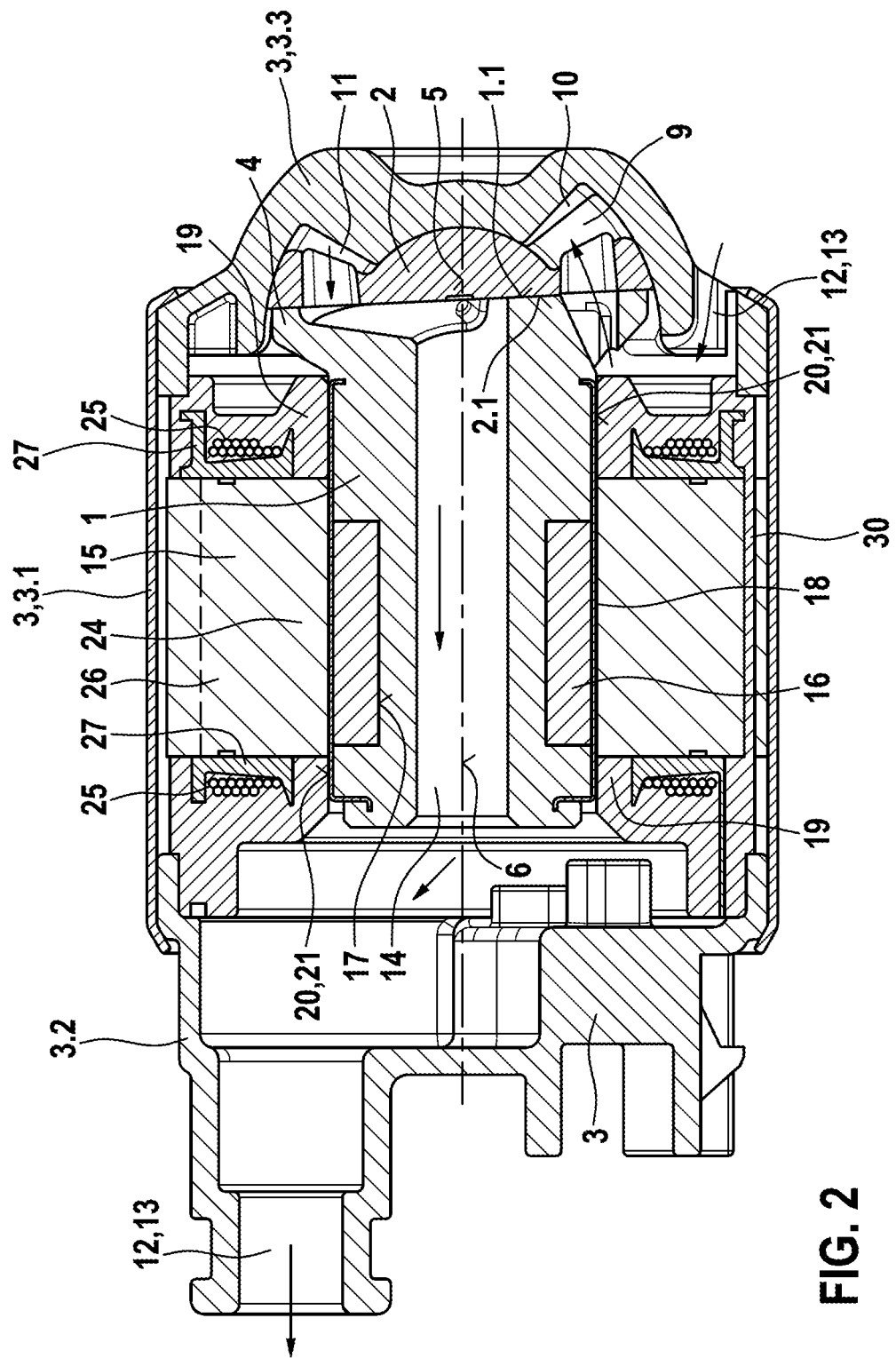
FIG. 2 shows a cross-sectional view of an alternative pump unit according to the invention.

Provision is made according to the invention for the drive shaft 1 to be surrounded by a stator 15 at least in certain sections and for magnets 16 to be provided on the drive shaft 1, said magnets interacting with the stator 15. By means of this embodiment according to the invention, the drive shaft 1 forms an armature of an electric machine, whereby the axial installation length is shortened, i.e. in the direction of the drive axis 6. As shown in FIG. 1, the magnets 16 are, for example, disposed centrally with respect to the stator 15 and as viewed in the direction of the drive axis. As shown in FIG. 2, the magnets 16 can alternatively be disposed on the drive shaft 1 off-center with respect to the stator 15 and as viewed in the direction of the drive axis 6 such that the drive shaft 1 is pressed with a certain predetermined magnetic force against the rotor 2. To this end, the magnets 16 are disposed on the drive shaft 1 offset in the direction facing away from the rotor 2, as shown in FIG. 2, as opposed to an arrangement centrally with respect to the stator 15, as shown in FIG. 1.

The stator 15 is, for example, formed by means of a packet of plate lamellas, which are made from so-called electrical sheets and are layered on top of each other.

At least one pocket or recess or at least one indentation 17 for accommodating the magnets 16 is, for example, provided on the drive shaft 1. The at least one pocket or recess 16 can be configured open or closed in a direction radially outwards with respect to the drive axis 6. The magnets 16 are permanent magnets in order to form a permanently excited electric machine. The magnets 16 can be designed as individual magnets or be formed on a single ring in which magnetic powder is embedded. The magnetic ring can, for example, be manufactured from a plastic material as base material, in which the magnetic powder is present in a distributed manner.

The drive shaft 1 can be covered in the region of the magnets 16 by a pot-shaped or cylindrical casing 18, which can also be a coating. The casing 18 is, for example, made from plastic and protects the magnets 16 from the fluid of the pump unit and/or fixes said magnets in the at least one pocket or recess 17.

According to the exemplary embodiment, a shaft bearing 20 or a receptacle for a shaft bearing 20 is provided on each end face of the stator 15. The shaft bearing 20 is designed, for example, as a slide bearing. The shaft bearings 20 are in each case provided on a disk-shaped or annular component 19, which, for example, rests against the end faces of the stator 15. The component 19 can be directly injection molded to the stator 15. The component 19 has a passage opening 21 for the drive shaft 1. The shaft bearing 20 can be disposed in the passage opening 21 as a separate component, for example as a slide bearing bushing. The passage opening 21 can, however, also itself form the slide bearing.

The stator 15 has stator teeth on an inner side thereof facing the drive shaft 1. A stator winding 25 is provided on each of said stator teeth, wherein stator grooves 26 are formed between the stator teeth 25. The stator grooves 26 can be filled with plastic, for example, such that the components 19 are integrally connected to one another by means of the plastic. Coil bodies 27 are, for example, provided on the stator teeth 25, which receive the stator winding 25 and electrically insulate the same from the stator 15.

The sections of the stator winding 25 protruding from the stator grooves 26 are, for example, likewise encapsulated with plastic and thereby protected from corrosion, wherein this encapsulation and the component 19 which, for example, is injection molded to the stator 15 can be produced as one piece in an injection molding process.

The plastic can also additionally be provided in certain sections on the outer circumference of the stator 15, for example as a web 30, and connect the disk-shaped or annular components 19 to one another.

The housing 3 comprises a hollow cylinder-shaped or pot-shaped housing section 3.1, which is closed on the end face thereof by at least one cover 3.2, 3.3. According to the exemplary embodiment, the housing 3 is hollow cylinder-shaped and is closed on the end faces thereof by respectively one cover 3.2, 3.3. One of the covers 3.2, 3.3 could, however, also be designed as the base of a pot-shaped housing section 3.1.

What is claimed is:

1. A pump unit comprising a drive shaft (1) and a rotor (2), wherein the rotor is driven by the drive shaft (1) and is arranged rotatably in a housing (3), wherein the drive shaft (1) has an oblique sliding plane (1.1), which interacts with the rotor (2) and allows said rotor (2) to nutate with a rotor axis (5) thereof about a drive axis (6) of the drive shaft (1), the rotor (2) having a set of teeth (9) on an end face of the rotor facing away from the drive shaft (1), said teeth meshing with a set of teeth (10) formed on the housing (3), working spaces (11) being formed between the teeth (9) of the rotor (3) and the teeth (10) of the housing (3), characterized in that the drive shaft (1) is surrounded by a stator (15) and magnets (16) are provided on the drive shaft (1), which magnets interact magnetically with the stator (15), wherein the magnets (16) are disposed on the drive shaft (1) off-center with respect to the stator (15) and as viewed in a direction of the drive axis (6) such that the drive shaft (1) is pressed with a predetermined magnetic force against the rotor (2).

2. The pump unit according to claim 1, characterized in that the drive shaft has at least one pocket or recess (17) for accommodating the magnets (16).

3. The pump unit according to claim 1, characterized in that the magnets (16) are permanent magnets.

4. The pump unit according to claim 1, characterized in that the drive shaft (1) is covered by a casing (18) in a region of the magnets (16).

5. The pump unit according to claim 1, characterized in that a shaft bearing (20) for mounting the drive shaft (1) is provided on each end face of the stator (15).

6. The pump unit according to claim 5, characterized in that the shaft bearing (20) is designed as a slide bearing.

7. The pump unit according to claim 5, characterized in that the shaft bearing (20) is provided on a disk-shaped or annular component (19).

8. The pump unit according to claim 1, characterized in that the stator (15) has stator teeth (24) on an inner surface thereof facing the drive shaft (1), on which teeth respectively one stator winding (25) is provided, stator grooves (26) being formed between the stator teeth (24).

9. The pump unit according to claim 1, characterized in that the housing (3) comprises a cylindrical or pot-shaped housing section (3.1), which is closed by at least one cover (3.2, 3.3) on an end face thereof.

* * * * *